(12) United States Patent
Balasubramanian et al.

(10) Patent No.: US 8,190,816 B2
(45) Date of Patent: May 29, 2012

(54) EMBEDDED SCALE-OUT AGGREGATOR FOR STORAGE ARRAY CONTROLLERS

(75) Inventors: Sridhar Balasubramanian, Wichita, KS (US); William A. Hetrick, Wichita, KS (US); William P. Delaney, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 455 days.

(21) Appl. No.: 12/387,610

(22) Filed: May 5, 2009

(65) Prior Publication Data

US 2010/0100679 A1    Apr. 22, 2010

Related U.S. Application Data

(60) Provisional application No. 61/106,309, filed on Oct. 17, 2008.

(51) Int. Cl.
    *G06F 12/00* (2006.01)
    *G06F 12/08* (2006.01)

(52) U.S. Cl. . 711/114; 711/170; 711/118; 711/E12.001; 710/22; 710/74

(58) Field of Classification Search .................. 711/114, 711/118
    See application file for complete search history.

(56) References Cited

U.S. PATENT DOCUMENTS

| | | | |
|---|---|---|---|
| 6,983,303 B2 * | 1/2006 | Pellegrino et al. ............ | 709/203 |
| 2007/0113016 A1 * | 5/2007 | Lam .............................. | 711/135 |
| 2007/0299951 A1 * | 12/2007 | Krithivas ...................... | 709/223 |
| 2009/0228676 A1 * | 9/2009 | Naganuma et al. ........... | 711/173 |
| 2010/0030960 A1 * | 2/2010 | Kamalavannan et al. .... | 711/114 |

* cited by examiner

*Primary Examiner* — Hoai V Ho
*Assistant Examiner* — Tri Hoang
(74) *Attorney, Agent, or Firm* — Haynes and Boone, LLP

(57) ABSTRACT

Methods and systems for dynamic storage tiering may comprise: discovering one or more remote virtual drives associated with one or more remote storage arrays; advertising one or more local virtual drives associated with a local storage array; receiving one or more IO requests from a client addressed to one or more remote virtual drives associated with one or more remote storage arrays; transmitting one or more command descriptor block (CDB) requests to one or more remote storage arrays associated with the one or more virtual drives to allocate local cache space and transmitting the one or more IO requests to the one or more remote storage arrays via Remote Direct Memory Access (RDMA).

21 Claims, 8 Drawing Sheets

EMBEDDED SCALE-OUT AGGREGATOR FOR STORAGE ARRAY CONTROLLERS

CROSS REFERENCE

The present application claims priority to U.S. Provisional Patent Application No. 61/106,309, filed on Oct. 17, 2008, which is hereby incorporated in its entirety.

BACKGROUND

Current technologies surrounding storage device aggregation are commonly based on Block level virtualization techniques using a Storage Virtualization Manager-like (SVM) appliance. Presently, clustering across multiple arrays require dedicated specialized hardware and/or a proprietary software solution on the IO path in order to present aggregated resources from multiple arrays in a clustered environment.

Such solutions may work only across storage arrays that have common protocols across IO paths. Further, current technologies may require either client agents and/or Data Path Modules (DPM) for provisioning IO path management in a virtualized environment. As such, aggregated resources having diverse protocols may require complex setup and management operations by an end-user.

SUMMARY

This invention disclosure describes a system and methodology by which diverse storage resources spread across multiple storage systems configured in a cluster may be aggregated and presented as one or more devices to the end user using an embedded scale out aggregator mechanism residing within the storage array controllers.

The present disclosure describes a system for device aggregation from Data Protection Layer (DPL) using Storage Management Initiative-Specification (SMI-S) based discovery spanning across multiple clustered storage arrays. An SMI-S based user interface with an abstraction layer may be provided in order to present common tasks to a user.

BRIEF DESCRIPTION OF THE DRAWINGS

The numerous advantages of the disclosure may be better understood by those skilled in the art by reference to the accompanying figures in which.

DETAILED DESCRIPTION

Figure 1:
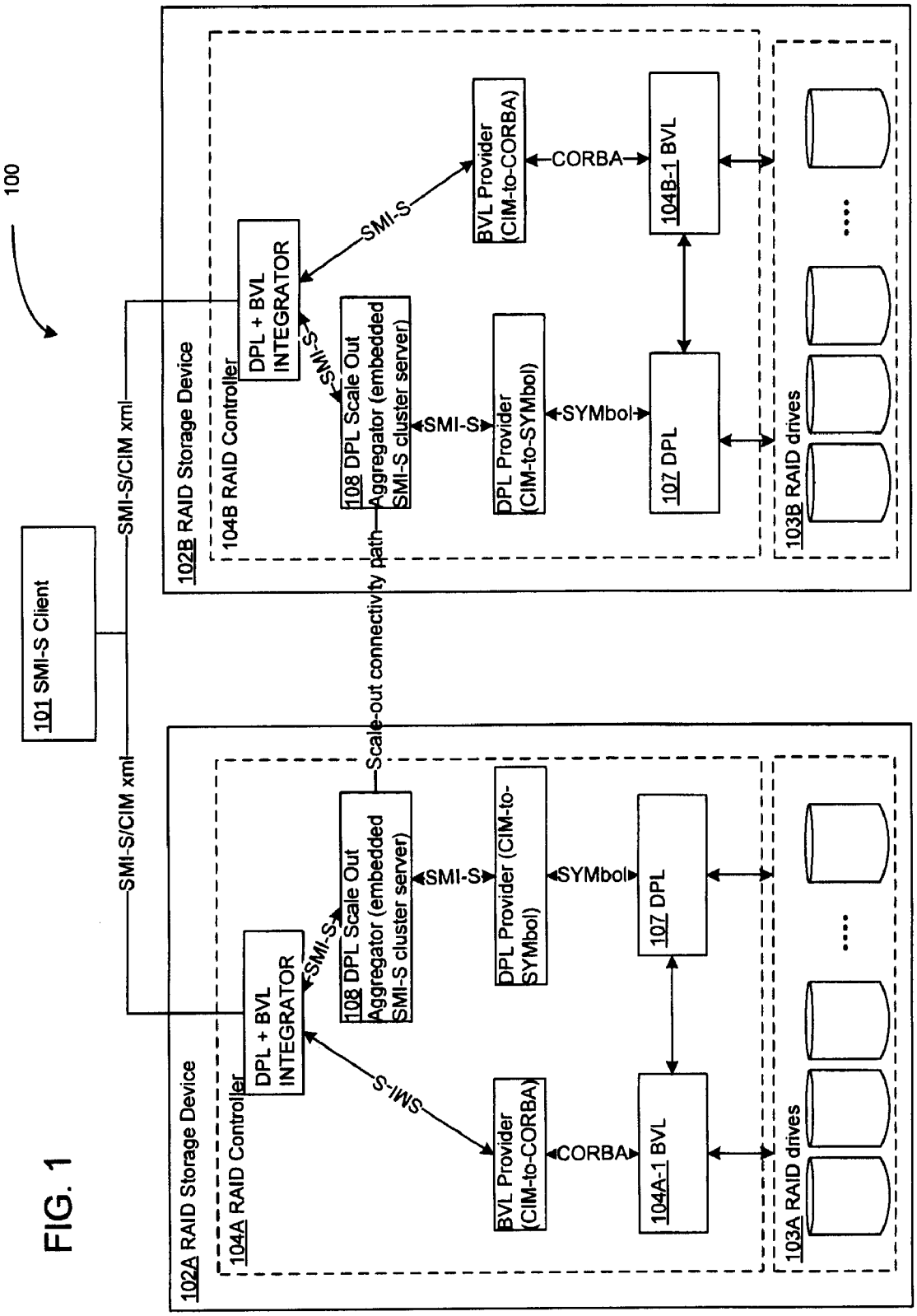
FIG. 1 shows a high-level block diagram of a system for configuring a storage network.

In the following detailed description, reference may be made to the accompanying drawings, which form a part hereof. In the drawings, similar symbols typically identify similar components, unless context dictates otherwise. The illustrative embodiments described in the detailed description, drawings, and claims may be not meant to be limiting. Other embodiments may be utilized, and other changes may be made, without departing from the spirit or scope of the subject matter presented here.

Referring to FIG. 1, an illustrative representation of a system 100 for scale-aggregation is presented. The system 100 may include at least one client 101 employing Storage Management Initiative-Specification (SMI-S) protocols. Such protocols have been developed and maintained by the Storage Networking Industry Association (SNIA). SMI-S is based upon the Common Information Model and the Web-Based Enterprise Management standards defined by the Distributed Management Task Force, Management via TCP/IP.

The system 100 may include two or more RAID storage devices 102 (e.g. RAID storage device 102A and RAID storage device 102B). A RAID storage device 102 (e.g. a first storage device of heterogeneous array of storage devices) may include a RAID controller 104 (e.g. RAID controller 104A and RAID controller 104B) configured to provided aggregation functionality in concert with another RAID storage device 102 (e.g. a second storage device of heterogeneous array of storage devices) which also includes a RAID controller 104.

The embedded scale-out aggregator architecture employed by the RAID controller 104 may be layered on top of a Data Protection Layer (DPL) provider interface 107. The DPL 107 may include storage array controller firmware responsible for guarding against loss of stored data using Redundant Array of Independent Disks (RAID) techniques as well as initiator and target drivers and management interfaces.

The embedded scale-out aggregator architecture employed by the RAID controller 104 may further include a Block Virtualization Layer (BVL) 104A-1 providing the core functionality and supporting user interfaces associated with a Storage Virtualization Manager (SVM) 104-1-1. The BVL module 104A-1 may be responsible for management of IO path access to virtual volumes and replication objects.

Figure 2:
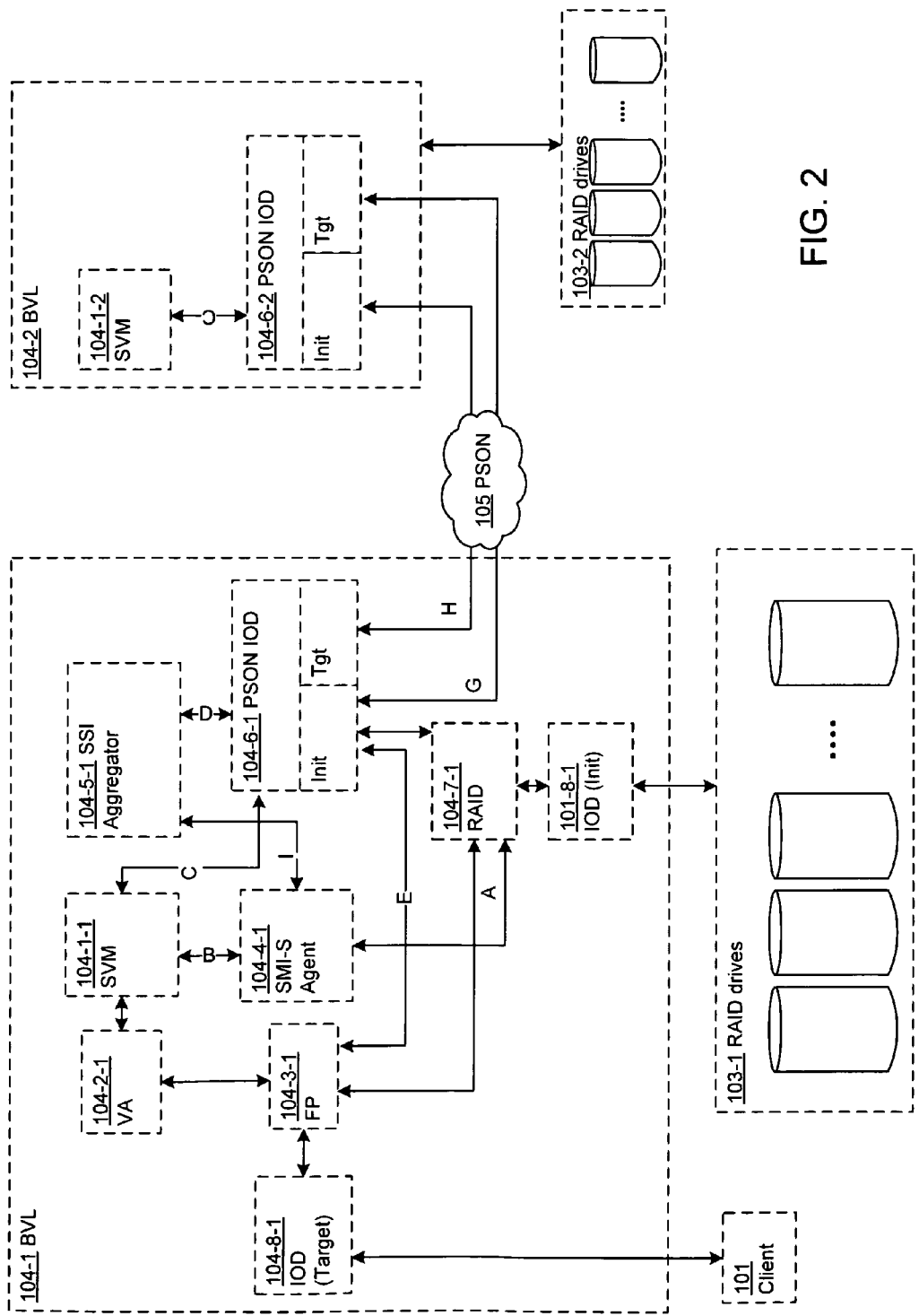
FIG. 2 is a high-level logic flowchart of a process.
Figure 3:
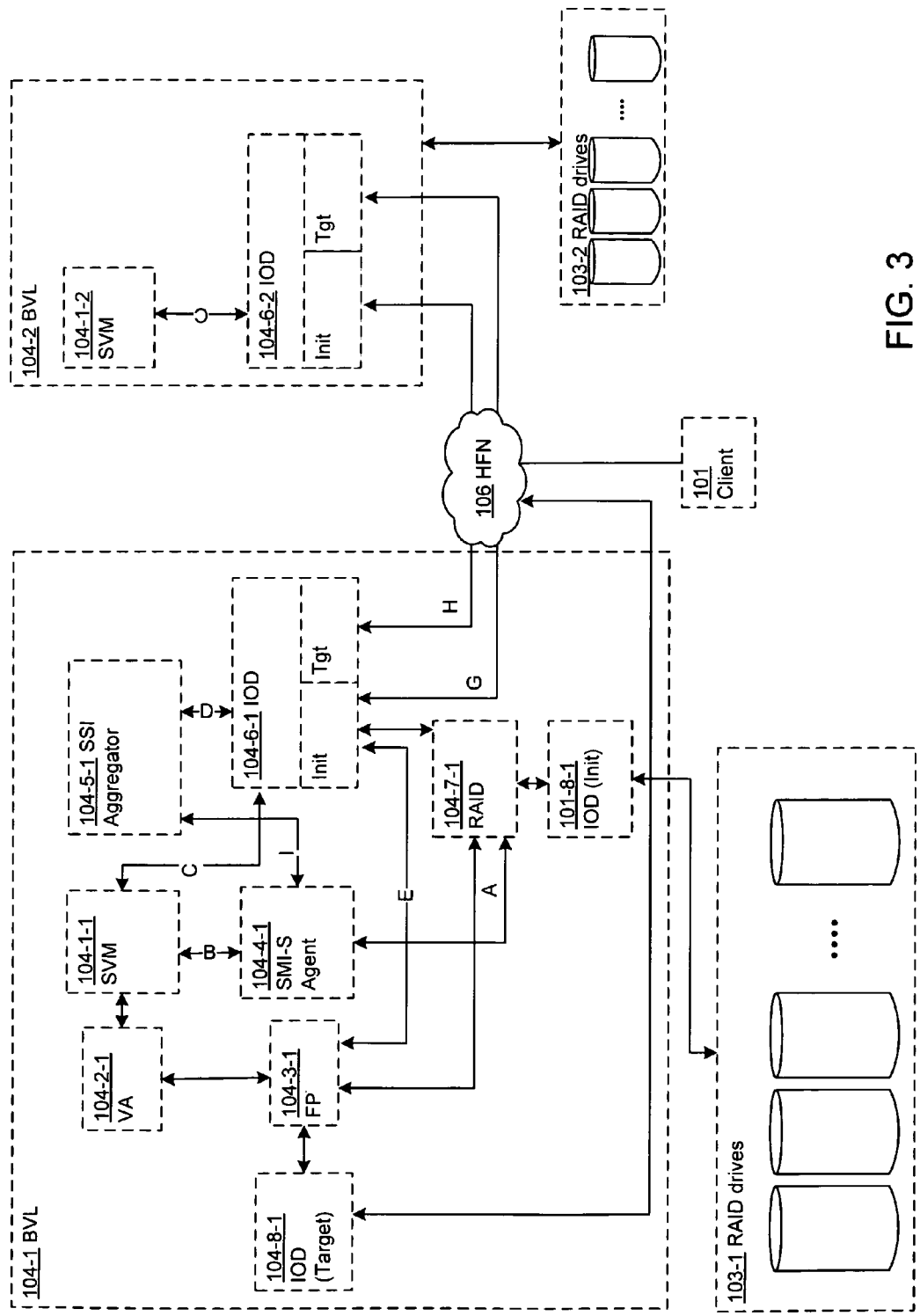
FIG. 3 is a high-level logic flowchart of a process.

Referring to FIGS. 2-3, high-level interactions between core blocks that constitute the scale-out architecture are presented. The core blocks may include one or more modules that may be implemented within RAID controller 104 firmware. The RAID controller 104A may include one or more input/output drivers (IOD) 104-6-1, 104-8-1. The IODs may provide initiator (e.g. IOD (Init)) and/or target (e.g. IOD (target)) modes of operation and may be multi-protocol capable (FC, SAS, iSCSI, and the like).

The RAID controller 104A may include one or more internal RAID engines 104-7-1. The RAID engines may expose one or more RAID volumes (i.e. virtual drives) including one or more RAID drives 103 (e.g. RAID drives 103A and 103B). The RAID volumes may be exposed via IODs.

The RAID controller 104A may include one or more Storage Virtualization Manager (SMV) modules 104-1-1. An SVM 104-1-1 may push virtualization definitions (e.g. pools, volumes, etc.) to a virtualization agent (VA) module 104-2-1. A VA module 104-2-1 may read and/or update mapping metadata corresponding to virtual storage pools including RAID drives 103A associated with the RAID controller 104A as well as other remote storage devices (e.g. RAID drives 103B associated with RAID controller 104B). The VA module 104-2-1 may further provide maps to a Fast Path (FP) module 104-3-1.

The FP module 104-3-1 may maintain a rapid-access mapping cache that maintains direct mappings for directly servicing IO requests directed to various back-end devices (e.g. RAID drives 103). This reduces the need for VA 104-2-1 involvement in IO request servicing.

The RAID controller 104A may manage scale-out entities (e.g. RAID storage device 102B via SMI-S via an embedded SMI-S agent 104-4-1. The embedded SMI-S agent 104-4-1 may interact with the SVM 104-1-1 (e.g. via path B) and the RAID engine 104-7-1 (via path A) to gather all component information, including logical and physical attributes.

The RAID controller 104A may conduct local and/or remote device discovery using the various scale-out architectural blocks. The RAID controller 104A utilizes the capabilities of the BVL module 104A-1 components to aggregate the back-end storage. An extension of this concept may allow storage pools to be spread across multiple storage arrays.

Such scale-out aggregation may provide the system 100 the ability to combine multiple storage arrays to form a larger, more capable aggregate system (e.g. a "storage cluster"). IO path access to any array allows access to all storage resources in a cluster. Administrators manage the cluster as a unified single-system, not a collection of independent components. Storage pools may then be built using virtual drives from multiple arrays.

Several methods may be employed in configuring a scale-out connectivity path from a local BVL to remote storage arrays.

Referring to FIG. 2, in a first method, a Private Scale-Out Network (PSON) 105 may be used. The PSON 105 may utilize Peripheral Component Interconnect Express (PCI-e) connectivity to provide high-speed inter-aggregator links.

Referring to FIG. 3, in a second method, a client-side IO network fabric (HNF) 106 may be used. The HNF 106 may employ a switch-based connectivity (e.g. Fibre Channel, Infiniband, iSCSI, and the like) that is used to connect clients 101 for driving IO to the storage arrays and to provide inter-aggregator links.

Following are descriptions relating to a series of flowcharts depicting various exemplary implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 4:
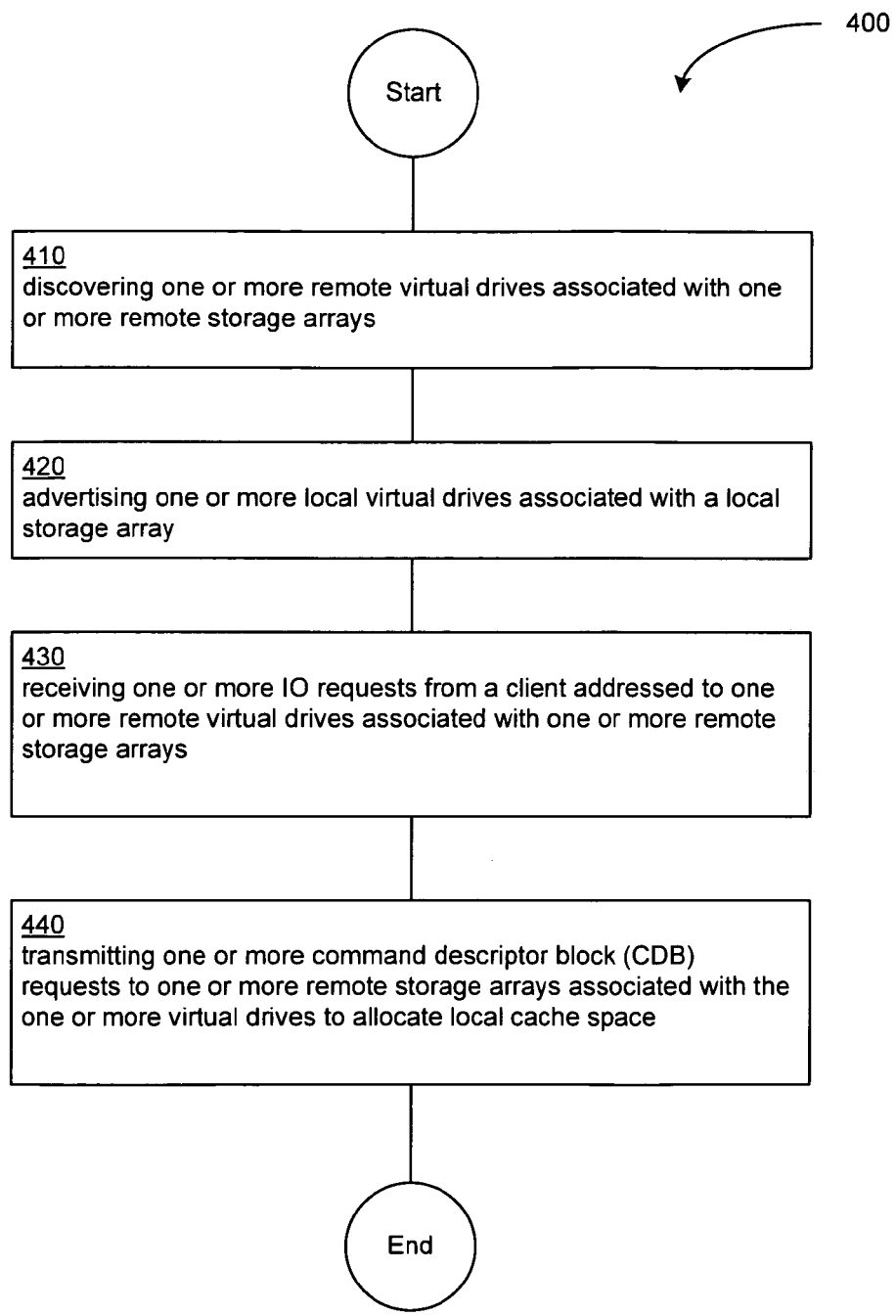
FIG. 4 is a high-level logic flowchart of a process.

FIG. 4 illustrates an operational flow 400 representing example operations related to configuring a storage network. In FIG. 4 and in following figures that include various examples of operational flows, discussion and explanation may be provided with respect to the above-described examples of FIGS. 1-2, and/or with respect to other examples and contexts. However, it should be understood that the operational flows may be executed in a number of other environments and contexts, and/or in modified versions of FIGS. 1-2. Also, although the various operational flows are presented in the sequence(s) illustrated, it should be understood that the various operations may be performed in other orders than those that are illustrated, or may be performed concurrently.

After a start operation, the operational flow 400 moves to an operation 410. Operation 410 depicts discovering one or more remote virtual drives associated with one or more remote storage arrays. For example, as shown in FIG. 2, the FP module 104-3-1 of BVL module 104A-1 of a local RAID storage device 102A may cause an associated PSON IOD (Init) 104-6-1 to transmit a query to a PSON IOD (target) 104-6-2 of a BVL 104B-1 of a remote RAID storage device 102B. The query may be transmitted via a PSON 105. The PSON 105 may employ PCI-e connectivity. The BVL module 104B-1 of the remote RAID storage device 102B may transmit status data associated with virtual volumes maintained by the BVL module 104A-1 in response to the query by the BVL module 104A-1 of the local BVL module 104A-1.

Alternately, as shown in FIG. 3, the FP module 104-3-1 of BVL module 104A-1 of a local RAID storage device 102A may cause an associated PSON IOD (Init) 104-6-1 to transmit a query to a PSON IOD (target) 104-6-2 of a BVL 104B-1 of a remote RAID storage device 102B. The query may be transmitted via a HNF 106. The HNF 106 may employ a fibre channel switch-based connectivity that is used to connect clients 101 for driving IO to the storage arrays and to provide inter-aggregator links. The BVL module 104B-1 of the remote RAID storage device 102B may transmit status data associated with virtual volumes maintained by the BVL module 104B-1 in response to the query by the BVL module 104A-1 of the local RAID storage device 102A.

Operation 420 depicts advertising one or more local virtual drives associated with a local storage array. For example, as shown in FIG. 2, the FP module 104-3-1 of the BVL module 104A-1 of the local RAID storage device 102A may cause an associated IOD (Init) 104-6-1 to advertise the status of the virtual volumes associated with the BVL module 104A-1 via the PSON 105 to a BVL module 104B-1 of a remote RAID storage device 102B to allow discovery of those associated virtual volumes by the BVL module 104B-1.

Alternately, as shown in FIG. 3, the FP module 104-3-1 of the BVL module 104A-1 of the local RAID storage device 102A may cause an associated IOD (Init) 104-6-1 to advertise the status of the virtual volumes associated with the BVL module 104A-1 via the HNF 106 to a BVL module 104B-1 of a remote RAID storage device 102B to allow discovery of those associated virtual volumes by the BVL module 104B-1.

Operation 430 depicts receiving one or more IO requests from a client addressed to one or more remote virtual drives associated with one or more remote storage arrays. For example, as shown in FIG. 2, the IOD (Target) 104-8-1 of the BVL module 104A-1 of the local RAID storage device 102A may receive a IO request from a client 101 to access (e.g. read from and/or write to) data maintained in one or more virtual drives maintained by BVL module 104B-1 associated with remote RAID storage device 102B.

Alternately, as shown in FIG. 3, the IOD (Target) 104-8-1 of the BVL module 104A-1 of the local RAID storage device 102A may receive a IO request from a client 101 via the HNF 106 to access (e.g. read from and/or write to) data maintained in one or more virtual drives maintained by BVL module 104B-1 associated with remote RAID storage device 102B.

Operation 440 depicts transmitting one or more command descriptor block (CDB) requests to one or more remote storage arrays associated with the one or more virtual drives to allocate local cache space. For example, as shown in FIG. 2, the FP module 104-3-1 of the BVL module 104A-1 of the local RAID storage device 102A may cause an associated PSON IOD (Init) 104-1-6 to transmit one or more CDB requests via the PSON 105 directing the BVL module 104B-1 associated with remote RAID storage device 102B to allocate cache space with in the BVL module 104B-1 logic.

Alternately, as shown in FIG. 3, the FP module 104-3-1 of the BVL module 104A-1 of the local RAID storage device 102A may cause an associated IOD (Init) 104-1-6 to transmit one or more CDB requests via the HNF 106 directing the BVL module 104B-1 associated with remote RAID storage device 102B to allocate cache space with in the BVL module 104B-1 logic. Further, the BVL module 104A-1 of the local RAID storage device 102A may also allocate cache space upon receiving the IO request from the client 101 so as to independently drive data transfers from the remote RAID storage device 102B.

Figure 5:
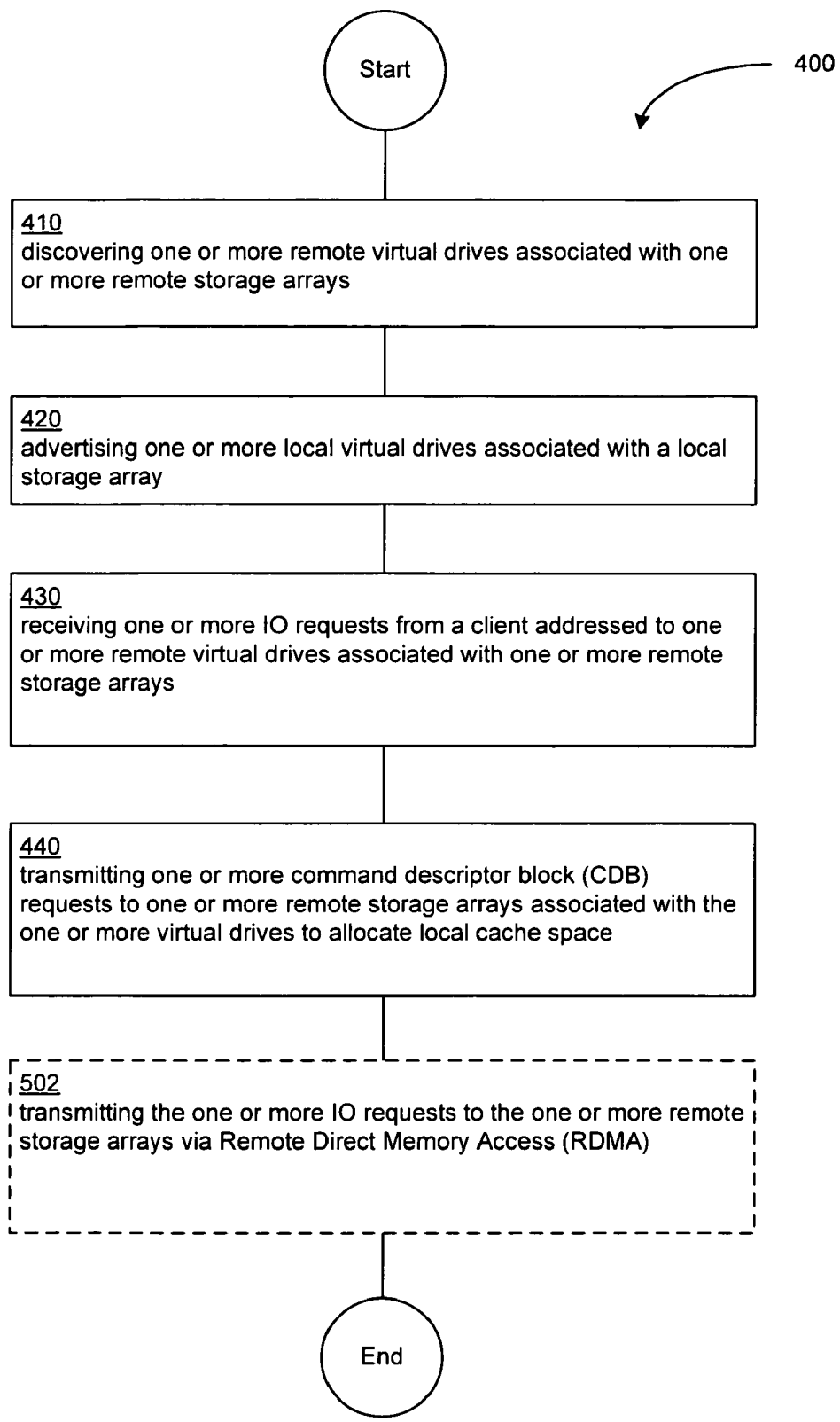
FIG. 5 is a high-level logic flowchart of a process.

FIG. 5 illustrates alternative embodiments of the example operational flow 400 of FIG. 4. FIG. 5 illustrates example embodiments where the operational flow 400 may include at least one additional operation. Additional operations may include an operation 502.

Operation 502 depicts transmitting the one or more IO requests to the one or more remote storage arrays via Remote Direct Memory Access (RDMA). For example, as shown in FIG. 2, a BVL module 104A-1 receiving an IO request from a client 101 that addresses data maintained in a virtual volume associated with a remote RAID storage device 102B may pass that IO request to the BVL module 104B-1 associated with remote RAID storage device 102B so as to process the IO request via RDMA on the PSON 105.

Figure 6:
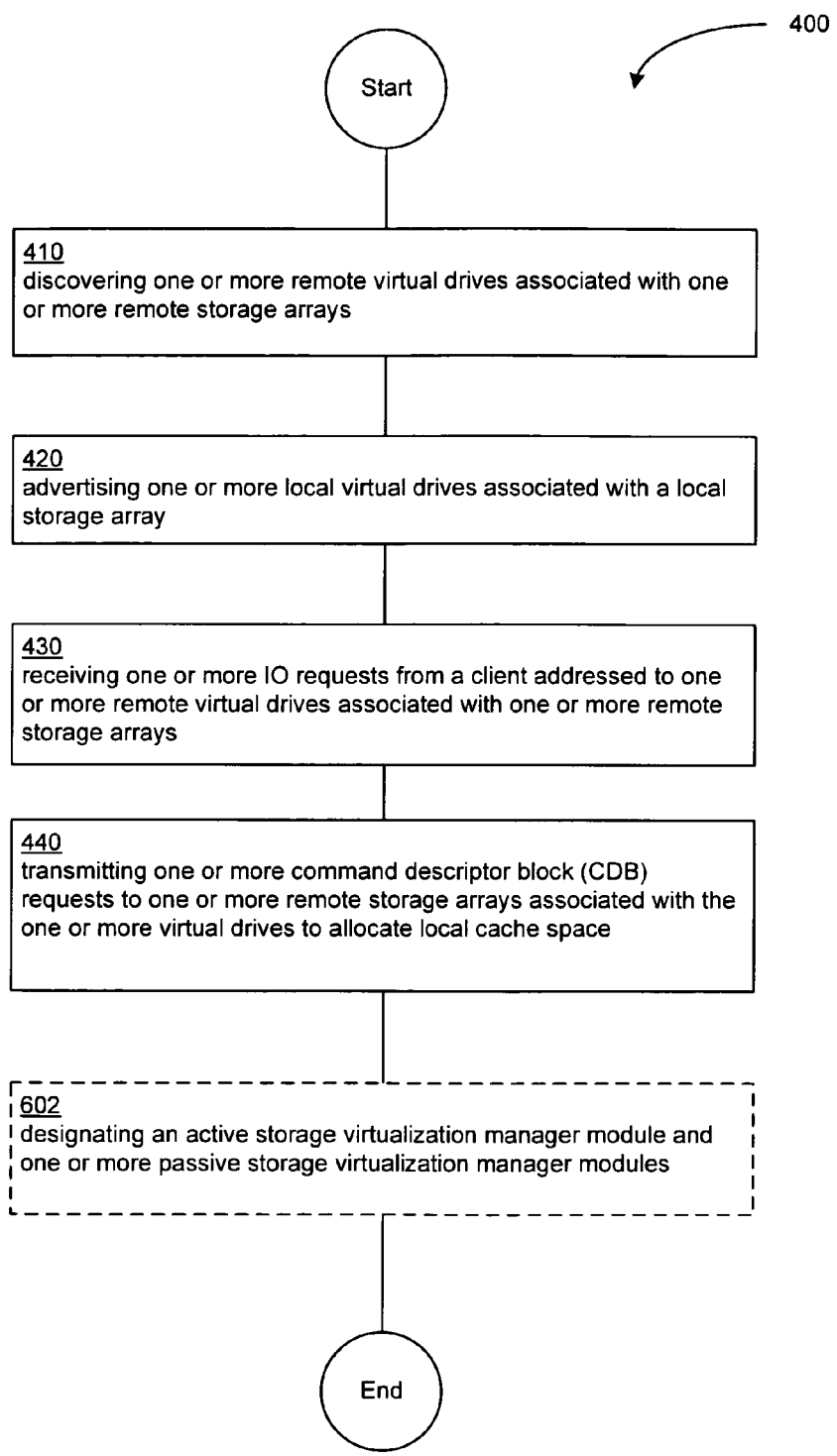
FIG. 6 is a high-level logic flowchart of a process.

FIG. 6 illustrates alternative embodiments of the example operational flow 400 of FIG. 4. FIG. 6 illustrates example embodiments where the operational flow 400 may include at least one additional operation. Additional operations may include an operation 602.

Operation 602 depicts designating an active storage virtualization manager module and one or more passive storage virtualization manager modules. For example, as shown in FIG. 3, SVM 104-1-1 of the local RAID storage device 102A may communicate with SVM 104-1-2 of a remote RAID storage device 102B via the HNF 106 network. SVM 104-1-1 may recognize the local VA module 104-2-1 and FP module 104-3-1 as well as a remote VA module (not shown) and a remote FP module (not shown) associated with a remote RAID storage device 102B via the IOD (Init) 104-6-1 and HNF 106 network operably coupling SVM 104-1-1 and SVM 104-1-2. This connection allows the SVM 104-1-1 and SVM 104-1-2 to designate one SVM 104-1 as the active SVM for the cluster and all other SVMs as passive members. For example, SVM 104-1-1 and SVM 104-1-2 may remain in constant communication via the HNF 106 network. Resources and applications for a cluster may be organized into functional units called resource groups. Each resource group may be assigned to a particular SVM 104-1 and can only be owned by that SVM 104-1 at any point in time. A cluster administrator (via an SMI-S client) may have the capability to set a particular SVM 104-1 as active (e.g. SVM 104-1-1) and the remaining SVM 104-1 (e.g. SVM 104-1-2) may be set as passive for a particular resource or application. The cluster management process may include SVM 104-1 failover capabilities. A failover may occur if a active SVM 104-1 (e.g. SVM 104-1-1) in a cluster is unavailable as a result of a failure. Should such a failure occur, another SVM 104-1 (e.g. SVM 104-1-2) may begins providing service as the active SVM 104-1.

Figure 7:
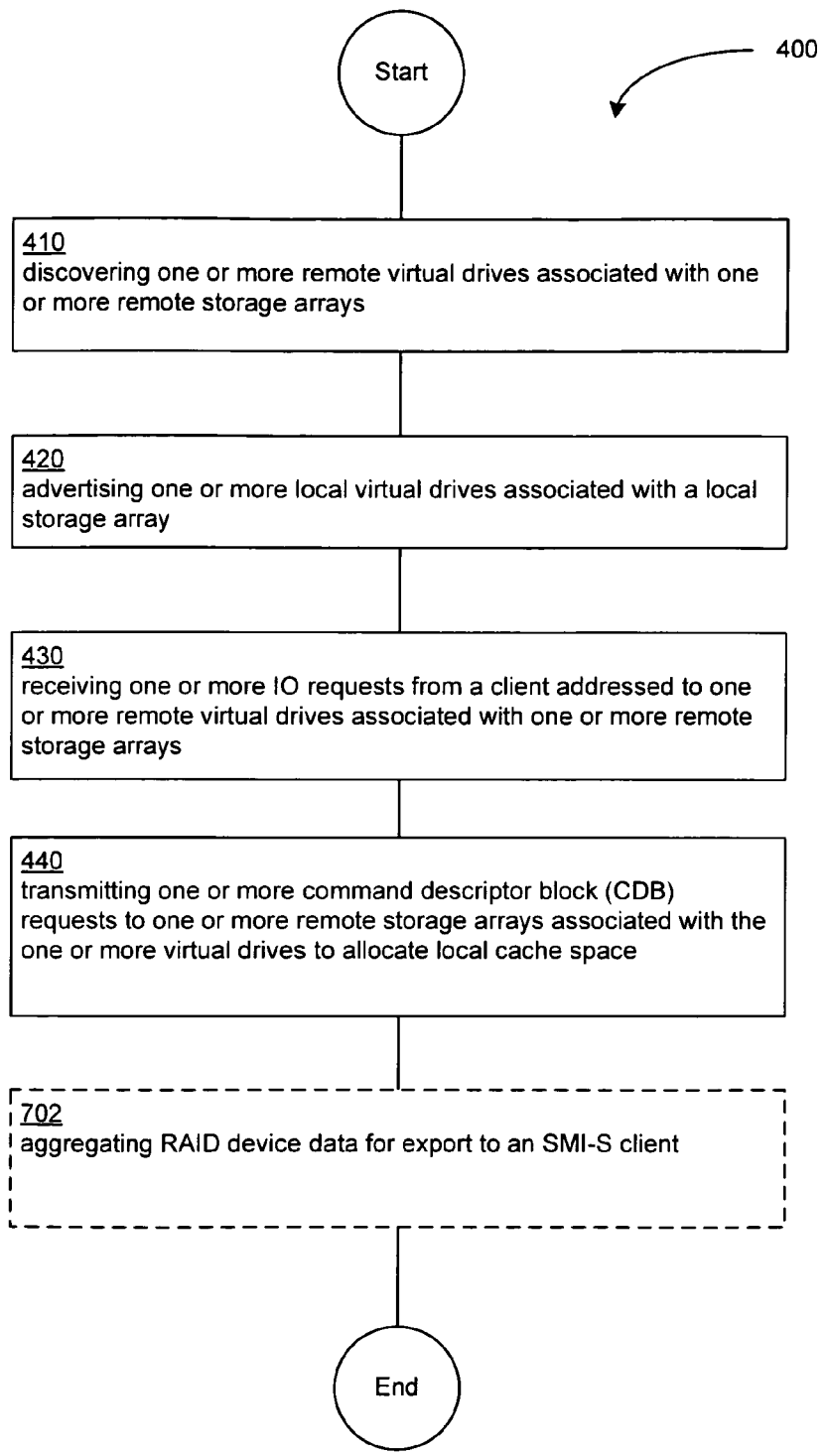
FIG. 7 is a high-level logic flowchart of a process.

FIG. 7 illustrates alternative embodiments of the example operational flow 400 of FIG. 4. FIG. 7 illustrates example embodiments where the operational flow 400 may include at least one additional operation. Additional operations may include an operation 702.

Operation 702 depicts aggregating RAID device data for export to an SMI-S client. For example, as shown in FIG. 2, a single-system image (SSI) aggregator 104-5-1 may be layered over the SMI-S agent 104-4-1 so as to export the component data, including logical attributes associated the SVM 104-1-1 (e.g. logical components, e.g. LUN maps, Pools, Volumes) and physical attributes associated with the RAID engine 104-7-1 (e.g. physical components, Virtual Drives, etc.). The component data gathered by the SMI-S agent 104-4-1 may be provided to the BVL module 104B-1 of a remote RAID storage device 104B such that the BVL module of each RAID storage device (e.g. RAID storage devices 102A and 102B may maintain an aggregated view of the status of the SVM and RAID engines of all RAID storage devices 102. The status data associated the SVM 104-1-1 and RAID engine 104-7-1 may be exported to peer devices via the PSON IOD (Init) 104-6-1 and associated PSON 105 network. Once the local BVL module 104A has an aggregated view of the status data of all SVM and RAID engines of all remote RAID storage devices 102, this data may be exported to the SMI-S client 101 so as to provided a single clustered image to the SMI-S client 101.

Figure 8:
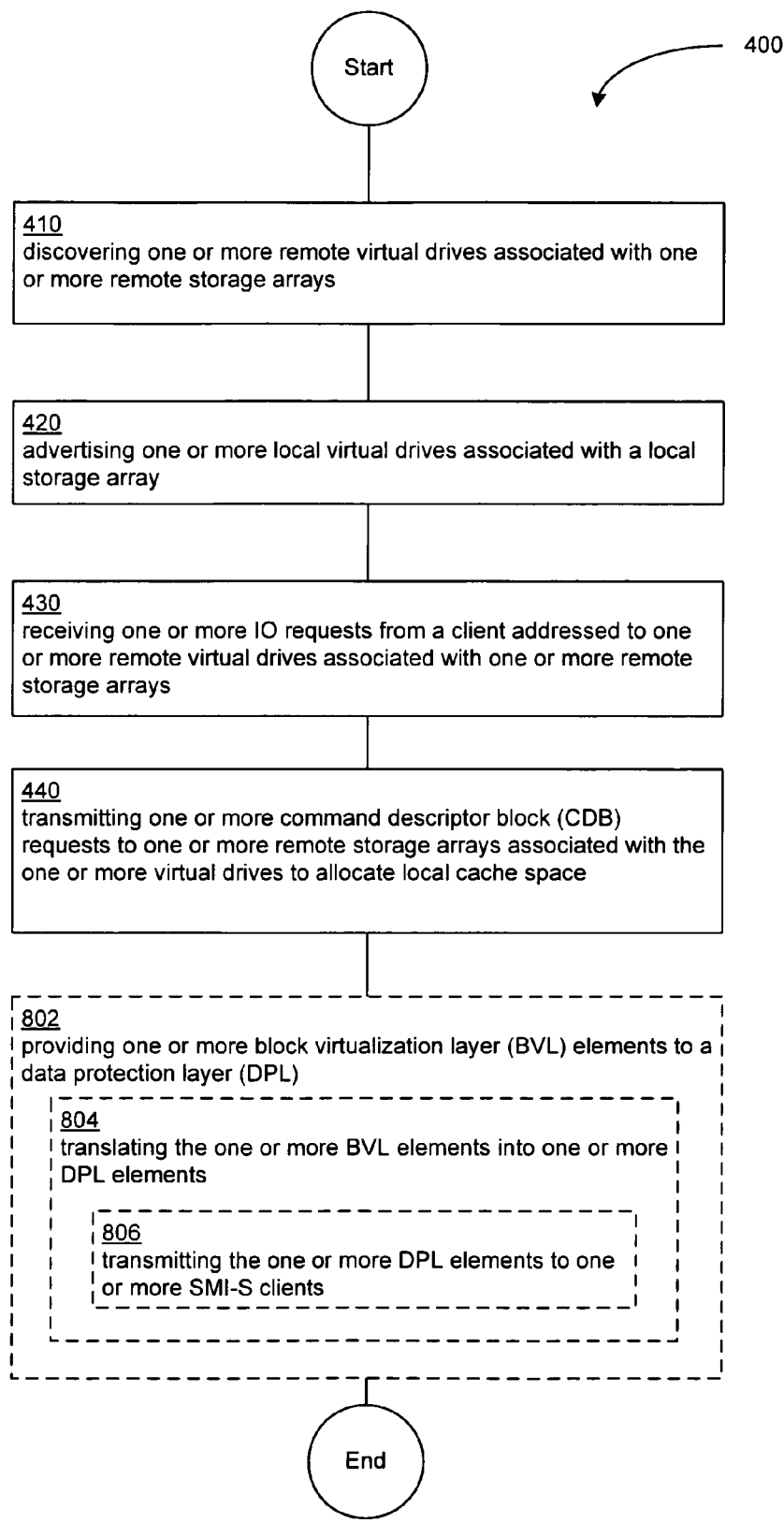
FIG. 8 is a high-level logic flowchart of a process.

FIG. 8 illustrates alternative embodiments of the example operational flow 400 of FIG. 4. FIG. 8 illustrates example embodiments where the operational flow 400 may include at least one additional operation. Additional operations may include an operation 802, an operation 804, and/or an operation 806.

Operation 802 depicts providing one or more block virtualization layer (BVL) elements to a data protection layer (DPL). For example, as shown in FIGS. 1-3, the BVL module 104A-1 (e.g. a CORBA server implementing SMV) of the RAID controller 104A may pass aggregated device data (e.g. data aggregated per operation 504) to a DPL 107 (e.g. a SYMbol server).

Operation 804 depicts translating the one or more BVL elements into one or more DPL elements. As shown in FIGS. 1-3, the DPL scale-out aggregator 108 (e.g. an SMI-S cluster server) of the RAID controller 104A may translate one or more BVL elements (e.g. logical components, e.g. LUN maps, storage pools, individual distributed virtual volumes, and the like) aggregated by the BVL module 104A-1 into one or more DPL elements (e.g. physical components, virtual drives, and the like) which may be directly managed by a SMI-S client 101. For example, a virtual volume spanning across multiple storage arrays as maintained by the BVL can be represented as one single DPL virtual drive so that the underlying details are masked from the user accessing the system via an SMI-S client.

Operation 806 depicts transmitting the one or more DPL elements to one or more SMI-S clients. For example, as shown in FIGS. 1-3, the DPL scale-out aggregator 108 may pass the translated BVL elements to the SMI-S client 101 as a single aggregated image of the clustered RAID storage devices 102.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A method for aggregating remote storage array resources comprising:
    discovering one or more remote virtual drives associated with one or more remote storage arrays;
    advertising one or more local virtual drives associated with a local storage array;
    receiving one or more IO requests from a client addressed to one or more remote virtual drives associated with one or more remote storage arrays; and
    transmitting one or more command descriptor block (CDB) requests to one or more remote storage arrays associated with the one or more virtual drives to allocate local cache space.

2. The method of claim 1, further comprising:
    transmitting the one or more IO requests to the one or more remote storage arrays via Remote Direct Memory Access (RDMA).

3. The method of claim 1, further comprising:
    designating an active storage virtualization manager module and one or more passive storage virtualization manager modules.

4. The method of claim 1, further comprising:
    aggregating RAID device data for export to an SMI-S client.

5. The method of claim 1, further comprising:
providing one or more block virtualization layer (BVL) elements to a data protection layer (DPL).

6. The method of claim 5, further comprising:
translating the one or more BVL elements into one or more DPL elements.

7. The method of claim 6, further comprising:
transmitting the one or more DPL elements to one or more SMI-S clients.

8. A system for aggregating remote storage array resources comprising:
means for discovering one or more remote virtual drives associated with one or more remote storage arrays;
means for advertising one or more local virtual drives associated with a local storage array;
means for receiving one or more IO requests from a client addressed to one or more remote virtual drives associated with one or more remote storage arrays;
means for transmitting one or more command descriptor block (CDB) requests to one or more remote storage arrays associated with the one or more virtual drives to allocate local cache space.

9. The system of claim 8, further comprising:
means for transmitting the one or more IO requests to the one or more remote storage arrays via Remote Direct Memory Access (RDMA).

10. The system of claim 8, further comprising:
means for designating an active storage virtualization manager module and one or more passive storage virtualization manager modules.

11. The system of claim 8, further comprising:
means for aggregating RAID device data for export to an SMI-S client.

12. The system of claim 8, further comprising:
means for providing one or more block virtualization layer (BVL) elements to a data protection layer (DPL).

13. The system of claim 12, further comprising:
means for translating the one or more BVL elements into one or more DPL elements.

14. The system of claim 13, further comprising:
means for transmitting the one or more DPL elements to one or more SMI-S clients.

15. A computer-readable medium comprising computer readable instructions which, when executed on a processor, cause the processor to execute a process, the process comprising:
discovering one or more remote virtual drives associated with one or more remote storage arrays;
advertising one or more local virtual drives associated with a local storage array;
receiving one or more IO requests from a client addressed to one or more remote virtual drives associated with one or more remote storage arrays; and
transmitting one or more command descriptor block (CDB) requests to one or more remote storage arrays associated with the one or more virtual drives to allocate local cache space.

16. The computer-readable medium of claim 15, further comprising:
transmitting the one or more IO requests to the one or more remote storage arrays via Remote Direct Memory Access (RDMA).

17. The computer-readable medium of claim 15, further comprising:
means for designating an active storage virtualization manager module and one or more passive storage virtualization manager modules.

18. The computer-readable medium of claim 15, further comprising:
means for aggregating RAID device data for export to an SMI-S client.

19. The computer-readable medium of claim 15, further comprising:
means for providing one or more block virtualization layer (BVL) elements to a data protection layer (DPL).

20. The computer-readable medium of claim 19, further comprising:
means for translating the one or more BVL elements into one or more DPL elements.

21. The computer-readable medium of claim 20, further comprising:
means for transmitting the one or more DPL elements to one or more SMI-S clients.

* * * * *